United States Patent [19]
Reines

[11] Patent Number: 5,343,910
[45] Date of Patent: Sep. 6, 1994

[54] EDGE ROUTER WITH A GUIDE DEVICE

[75] Inventor: Wolfgang Reines, Nuertingen, Fed. Rep. of Germany

[73] Assignee: Karl M. Reich Maschinenfabrik GmbH, Nuertingen, Fed. Rep. of Germany

[21] Appl. No.: 97,757

[22] Filed: Jul. 26, 1993

[30] Foreign Application Priority Data

Aug. 17, 1992 [DE] Fed. Rep. of Germany ....... 4227071

[51] Int. Cl.$^5$ ........................... B27C 5/10; B23C 1/20
[52] U.S. Cl. ................................ 144/134 D; 144/137; 144/144 R; 144/371; 409/182
[58] Field of Search ................... 144/1 E, 1 F, 134 R, 144/134 D, 136 R, 136 C, 371; 409/182

[56] References Cited
U.S. PATENT DOCUMENTS

| | | | |
|---|---|---|---|
| 2,935,102 | 5/1960 | Potter | 144/136 C |
| 3,196,749 | 7/1965 | Zanni | 409/182 |
| 3,494,394 | 2/1970 | Stock | 144/136 C |
| 4,041,997 | 8/1977 | Selfe | 409/182 |
| 4,763,707 | 8/1988 | Hounshell | 409/182 |
| 4,988,245 | 1/1991 | Fukuda | 409/182 |

FOREIGN PATENT DOCUMENTS 1220405  5/1960  France ............................... 144/1 F Primary Examiner—W. Donald Bray
Attorney, Agent, or Firm—W. G. Fasse; W. F. Fasse

[57] ABSTRACT

An edge router for milling off protruding margins of edge bands that have been glued or bonded to the narrow edges of a panel type work piece is properly guided even if the edges are rounded, curved, or otherwise uneven. For this purpose, the guide device extending in parallel to the milling or drive shaft of the edge router is provided in the form of two separate parallel guide elements (9, 9'). Even if the guide roller rolls along a curved or rounded, or otherwise uneven edge and even if one of the guide elements is already outside the surface of the work piece, the other parallel guide element will still be positively engaged with the top surface of the panel type work piece for positive guiding at all times.

6 Claims, 2 Drawing Sheets

EDGE ROUTER WITH A GUIDE DEVICE

FIELD OF THE INVENTION

The invention relates to an edge router provided with a guide device so that the edge router is properly guided, even if the work piece has a rounded edge or even a curved edge.

BACKGROUND INFORMATION

Edge routers, or so-called edge bevelling tools or machines are known in the art for the purpose of trimming the edges of work pieces, such as panel work pieces made of wood or the like. More specifically, such tools are used to trim off any protruding margins of edge bands or tapes that have been bonded to the narrow edges of a panel work piece by an edge gluing machine. These edge routers are held manually by an operator and are guided relative to the work piece by a guide stop mechanism that defines two guide surfaces extending perpendicularly to each other. One guide element is a surface type element that contacts the top surface of the work piece panel. The other guide element or guide stop element contacts the narrow edge of the work piece and thus runs along the edge band that has been glued to the narrow work piece edge.

Conventional edge routers are suitable only for panel work pieces having a plane narrow edge surface. A problem arises when the narrow work piece edge has a rounded or otherwise curved profile. In that case, the margins of the edge band can no longer be properly milled off because the stop guide member that engages the curved narrow edge is now no longer properly or positively guided.

OBJECTS OF THE INVENTION

In view of the foregoing it is the aim of the invention to achieve the following objects singly or in combination:

to provide an edge router that solves the above problem and provides a proper, positive guiding of the handheld router independently of the cross-sectional profile of the edge, the margins of which are to be trimmed;

to assure a proper trimming of top and bottom margins even along curved or rounded narrow work piece edges and even edges that have a concave curvature; and to construct the stop guide devices to be adjustable and/or removable, relative to a rotational router axis.

SUMMARY OF THE INVENTION

An edge router according to the invention is characterized by a guide mechanism which has a first guide stop device extending in parallel to the longitudinal router axis of the router drive shaft and a second guide stop device extending perpendicularly to the drive shaft or to said longitudinal router axis of the drive shaft. The first guide stop device comprises two separate guide elements that extend in parallel to the drive shaft of the router and are so arranged that one guide element is positioned on one side of the drive shaft while the other guide element is arranged oppositely on the other side of the drive shaft.

This construction of the guide stop device with two separate guide elements parallel to the drive shaft makes it possible to guide the router positively relative to the surface of the work piece panel for milling off any protruding margins of the edge band. Additionally, the present router has a sensor roller which is capable of positively following a curved narrow edge of the work piece when the sensor roller moves off the flat work piece surface, whereby the milling tool is properly or positively guided by the second guide stop element that still engages the work piece surface because it trails the first guide element and the milling tool or router bit secured to the drive shaft of the router, whereby the still engaging parallel guide element and the guide element extending perpendicularly thereto makes sure that the tool is positively guided even when the sensor roller travels along a curved edge surface.

Preferably, each of the parallel guide elements is equipped with its own handle or grip so that the router can be positively held even if the margins of an edge band must be trimmed that extends perpendicularly relative to rounded, curved, or otherwise uneven profiles, for example, as are present in so-called post forming panels and soft forming panels having random cross-sections. All such work pieces can now be milled along their edges without any faults or difficulties.

In another preferred embodiment at least one of the parallel guide elements is removable so that even concave or inwardly extending radii can be properly trimmed. In another preferred embodiment the guide element that extends perpendicularly to the drive shaft of the router is adjustably secured to the router housing so that it is now possible to properly mill with precision slanted, bevelled, or rounded edges. It is preferable to construct the sensor roller as a ball bearing so that the outer race of the ball bearing can cooperate with a brake mechanism in such a way that the driving torque of the router drive shaft cannot entrain the outer race of the ball bearing, whereby the marring of the work piece surface is avoided.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
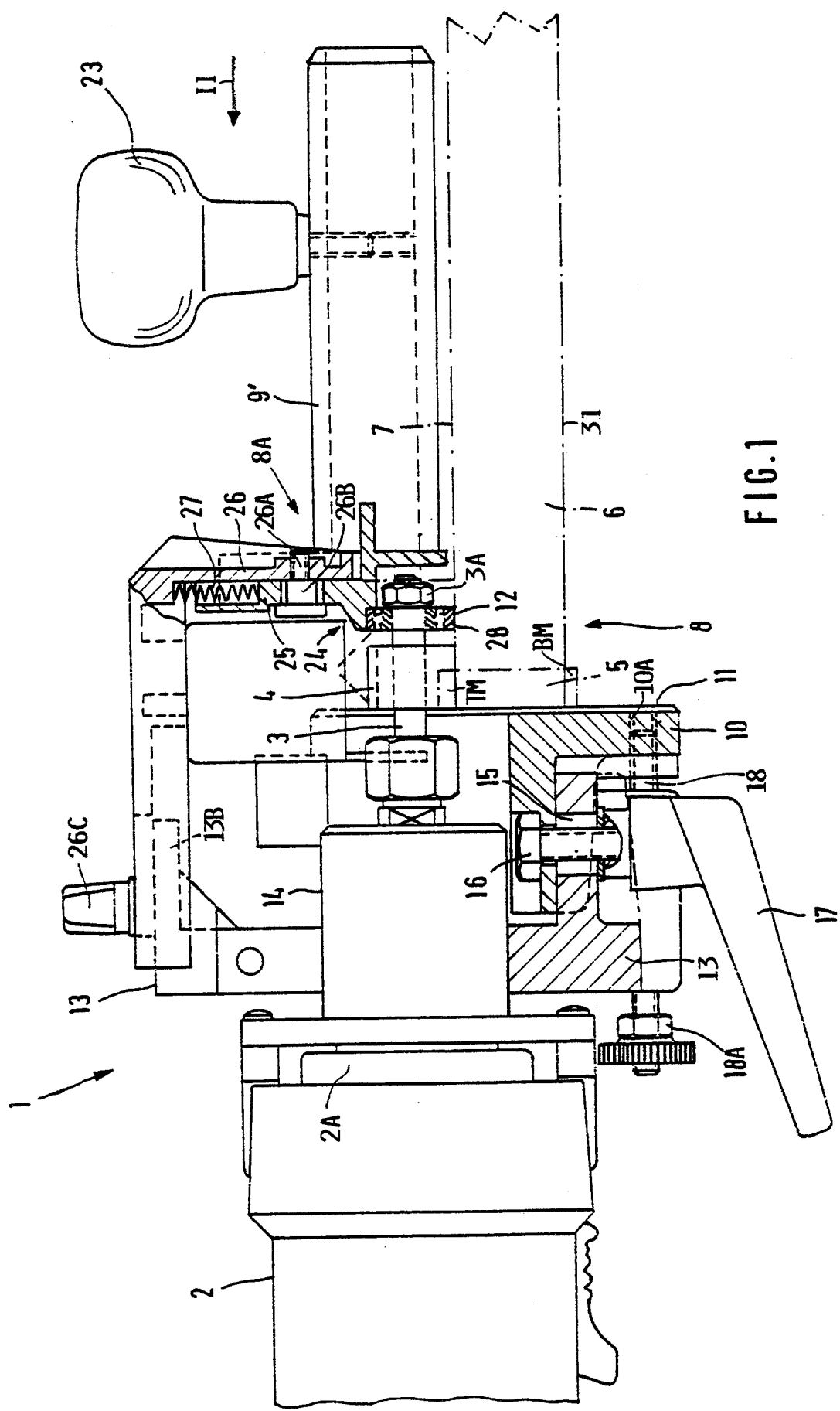
FIG. 1 is a side view partly broken away and partly in section of an edge router according to the invention, whereby the section plane extends along section I—I in FIG. 2.

FIG. 1 shows an edge router 1 having a housing 2 in which a motor 2A is conventionally housed. The motor 2A drives a milling shaft or drive shaft 3 to which there is secured, preferably in a removable manner a milling tool or router bit 4 for trimming off a top margin TM and a bottom margin BM of an edge band 5 that has been glued to a panel type work piece 6 around the narrow edges of the work piece. The top and bottom margins TM, BM are to be milled off so that the remaining edge band 5 extends flush with the top surface 7 and with the bottom surface 31 of the work piece 6. Further details of the operation of the edge router will be described below.

The edge router 1 is equipped with a stop guide mechanism 8 including a first guide stop device 8A comprising two separate, parallel guide elements 9, 9' (FIG. 2) extending in parallel to the router drive shaft 3 and a second guide stop device 10 extending perpendicularly to the drive shaft 3. The second guide stop device 10 has a guide surface or wall 11 that contacts a lateral edge of the work piece 6 while the first guide stop device with its elements 9, 9' contacts the top surface 7 of the work piece 6.

At least one sensor roller 12 constructed as a ball bearing having an outer race 28 for contacting the surface 7 of the top work piece 6 is secured to the drive shaft 3, preferably near its free end with a nut 3A engaging a threaded end of the drive shaft 3. The first stop guide device 8A and the second stop guide device 10 are secured to the housing 2 of the router 1. For this purpose the housing 2 has an extension 14 to which a mounting frame 13 is secured. In a preferred embodiment the stop guide device 10 is adjustably secured to the mounting frame 13 by a screw 16 passing through an opening 15 in the mounting frame and cooperating with a clamping lever 17. As the clamping lever 17 is rotated clockwise, it tightens the guide device 10 to the mounting frame 13. When the clamping lever 17 is turned counterclockwise, the device 10 with its guide wall 11 becomes adjustable in parallel to the longitudinal axis of the drive shaft 3. For this rough adjustment the opening 15 is larger than the diameter of the screw 16 to provide a rough adjustment range.

Figure 2:
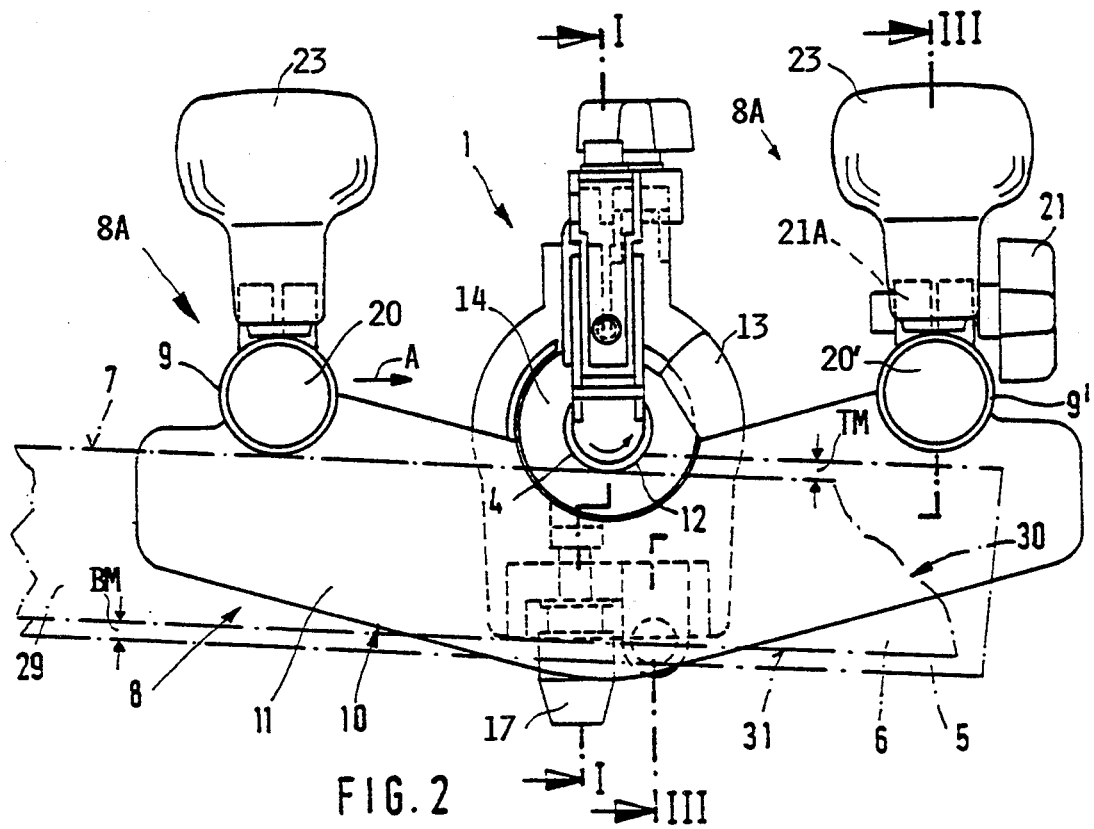
FIG. 2 is a view in the direction of the arrow II in FIG. 1.
Figure 3:
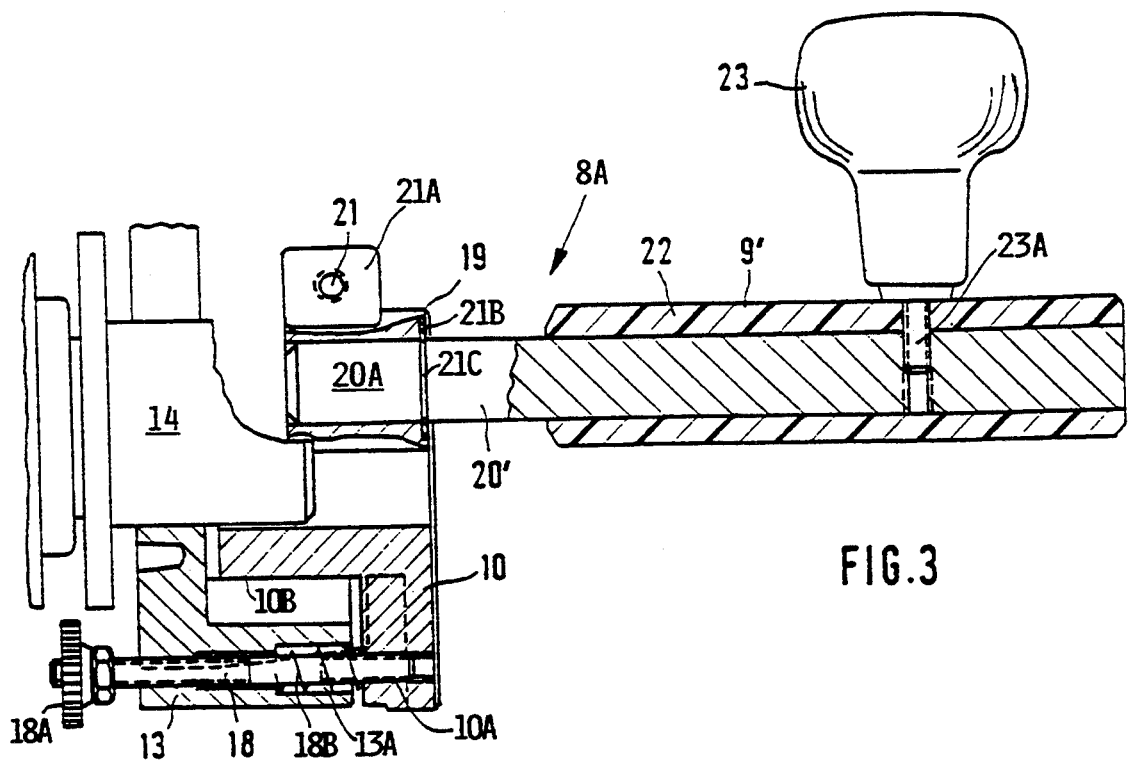
FIG. 3 is a sectional view along the section line III—III in FIG. 2, whereby a handle is not shown in section but rather in a side view.

A further fine adjustment is possible by means of a threaded spindle 18 engaging a threaded hole 10A in the guide device 10 as best seen in FIG. 3 showing the adjustment spindle 18 passing through a bore in the mounting frame 13 and reaching with its threaded free end into engagement with the threaded hole 10A in the device 10. The adjustment spindle 18 has a knurled head 18A to facilitate the manual fine adjustment of the position of the guide device 10 relative to the mounting frame 13 in parallel to the drive shaft 3. During the adjustment a surface of the device 10 slides on a respective surface of the frame as shown at 10B. A biasing compression spring 18B located in a chamber 13A of the frame 13 and surrounding the spindle biases the device 10 away from the frame 13. Please see FIG. 3, which also shows that preferably the first guide device 8A with its separate, parallel guide elements 9, 9' is adjustably secured to the second guide device 10 which is connected to the housing 2 through the mounting frame 13. Referring further to FIGS. 2, 3 the two separate parallel guide elements 9, 9' are constructed as cylindrical sleeves 22 of a plastic material that will not scratch the surfaces 7, 31 of the work piece 6. These sleeves 22 of relatively soft material are received on cylindrical mounting pins 20, 20' which in turn have a clamped end 20A received in a slotted eye 19 forming part of the second stop guide device 10. A clamping mechanism 21A clamped tight by a screw 21 having a winged head holds the cylindrical mounting pins 20, 20' in place. An axial displacement of the mounting pins 20, 20' is prevented by a spring ring 21B engaging a groove 21C in the respective mounting pin 20, 20'. Each of the guide elements 9, 9' with their respective mounting pin 20, 20' is provided with a handle 23 screwed into the mounting pin as shown at 23A.

Referring again to FIG. 1, the sensor roller 12 cooperates with a brake mechanism 24 having a brake shoe 25 mounted to a bail 26 by a screw 26A that permits when loosened a vertical displacement of the brake shoe 25 relative to the bail 26. For this purpose the neck 26B of the screw 26A has a shoulder bearing against the bail 26 and a diameter smaller than a diameter of a hole in the brake shoe 25, whereby the difference between the neck diameter of the neck 26B and the hole diameter in the brake shoe 25 limits the vertical displacement of the brake shoe 25 perpendicularly to the rotational axis of the drive shaft 3. The bail 26 in turn is secured to a support bracket 13B of the mounting frame 13 by a winged clamping screw 26C. A compression spring 27 is operatively held between the brake shoe 25 and the bail 26 for biasing the brake shoe 25 with its radially facing surface against the outer race 28 of the ball bearing that forms the sensor roller 12, thereby preventing that the rotation of the drive shaft 3 entrains the outer race 28 during the milling operation to prevent marring the surface 7 of the work piece 6. Thus, the outer race 28 can rotate independently of shaft 3.

Referring to FIG. 2, the operation of the present guide mechanism will now be described. FIG. 2 shows a view in the direction of the arrow II in FIG. 1, thereby primarily showing the two guide mechanisms 8 and 8A. The work piece 6 in the form of a panel has, as mentioned, a top plane surface 7, a bottom plane surface 31, a plane vertical narrow edge surface 29, and a curved edge surface 30. The edge surface 29 is covered by an edge band 5 having the upwardly protruding top margin TM and the downwardly protruding bottom margin BM that must be milled off. A substantial portion of the top margin TM has already been milled off, only the right-hand end portion still needs to be milled off. For milling off the bottom margin BM, the work piece 6 will be turned around.

The milling operation proceeds in FIG. 2 from left to right as indicated by the arrow A. At this point the parallel guide element 9 still firmly slides along the top surface 7 of the work piece 6 while the right-hand guide element 9' has already passed over the edge 30 of the work piece. The surface 11 of the guide device 10 still rests firmly against the vertical edge 29 of the work piece 6. When the sensor roller 12 reaches the right-hand top end of the surface 7 where it merges with the curved edge surface 30, the sensor roller 12 will follow the S-curved profile of the edge surface 30 so that the guide element 9 and the surface 11 of the guide device 10 are still in firm and positive contact with the work piece, thereby permitting the proper milling of both margins TM and BM.

Although the invention has been described with reference to specific example embodiments, it will be appreciated that it is intended to cover all modifications and equivalents within the scope of the appended claims.

What I claim is:

1. An edge router comprising a housing, a guide mechanism secured to said housing, a motor in said housing, a drive shaft (3) driven by said motor for driving a router bit, at least one sensor roller on said drive shaft for sensing a work piece surface, said guide mechanism comprising a first guide stop device (8A) extending in parallel to a longitudinal rotational router axis of said drive shaft (3) and a second guide stop device (10) extending perpendicularly to said drive shaft (3), said first guide stop device (8A) comprising two separate guide elements (9, 9') arranged in parallel to each other and in parallel to said drive shaft (3), one of said separate guide elements being arranged on one side of said drive shaft, while the other of said separate guide elements is arranged on the opposite side of said drive shaft for guiding said edge router when milling off margins of an edge cover band bonded to flat, rounded, or curved edges of a panel work piece.

2. The edge router of claim 1, wherein said two separate guide elements are two cylindrical guide shafts extending in parallel to said drive shaft, said edge router further comprising means for removably securing said cylindrical guide shafts to said housing.

3. The edge router of claim 1, further comprising a mounting frame (13) connected to said housing, first connecting devices (21) for removably securing said two separate guide elements (9, 9') to said mounting frame (13), and second connecting devices (16, 17, 18) for adjustably securing said second guide stop device (10) to said mounting frame (13).

4. The edge router of claim 1, further comprising at least one separate handle (23) connected to each of said separate guide elements (9, 9').

5. The edge router of claim 1, wherein said sensor roller (12) comprises a ball bearing having an inner race secured to said drive shaft (3) and an outer race (28) rotatable relative to said inner race, said edge router further comprising a brake (24) mounted to said housing and including a brake member (25) for engaging said outer race (28), said brake further comprising a spring (27) for biasing said brake member (25) against said outer race.

6. The edge router of claim 3, wherein said first connecting devices (21, 21A) removably secure said separate guide elements (9, 9') to said second guide stop device (10) which in turn is adjustably secured to said mounting frame (13) by said second connecting devices.

* * * * *